(12) United States Patent
McAlister

(10) Patent No.: US 6,756,140 B1
(45) Date of Patent: Jun. 29, 2004

(54) ENERGY CONVERSION SYSTEM

(76) Inventor: Roy E. McAlister, 1739 W. 7th Ave., Mesa, AZ (US) 85202

( * ) Notice: Subject to any disclaimer, the term of this patent is extended or adjusted under 35 U.S.C. 154(b) by 0 days.

(21) Appl. No.: 09/128,673

(22) Filed: Aug. 3, 1998

Related U.S. Application Data

(63) Continuation-in-part of application No. 07/364,309, filed on Jun. 12, 1989, now abandoned, and a continuation-in-part of application No. 07/990,071, filed on Dec. 14, 1992, now Pat. No. 5,343,699, and a continuation-in-part of application No. 07/755,323, filed on Sep. 5, 1991, now Pat. No. 5,394,852, and a continuation-in-part of application No. 08/268,680, filed on Jun. 30, 1994, now abandoned.

(51) Int. Cl.$^7$ .............................................. H01M 8/06
(52) U.S. Cl. ....................................................... 429/20
(58) Field of Search .................................... 429/19, 20

(56) References Cited

U.S. PATENT DOCUMENTS

| | | | | |
|---|---|---|---|---|
| 4,376,097 A | * | 3/1983 | Emelock | 429/17 X |
| 4,547,356 A | * | 10/1985 | Papineau | 429/19 X |
| 5,149,600 A | * | 9/1992 | Yamase et al. | 429/20 X |
| 5,343,699 A | * | 9/1994 | McAlister | 60/273 |
| 5,394,852 A | * | 3/1995 | McAlister | 123/494 |
| 5,991,670 A | * | 11/1999 | Mufford et al. | 429/19 X |

* cited by examiner

*Primary Examiner*—Stephen Kalafut

(57) ABSTRACT

A process for performing energy conversion which comprises the steps of converting a fuel precursor containing hydrogen to produce substantial amounts of engine-fuel containing free hydrogen and utilizing substantial amounts of hydrogen in one or more devices selected from the group including a fuel cell, heat engine, and heat releasing combustor. Waste energy resources selected from the group including off-peak power, engine-cooling-system heat, exhaust-gas heat, and stopping energy, are utilized to produce engine-fuel from feedstocks selected from the group (of Equations 1–14) including fuel alcohols, phenols, ammonia, ammonium compounds, gasoline, diesel fuel, cyanoacetic acid, cyanocarbons, carbon, and water.

17 Claims, 3 Drawing Sheets

ENERGY CONVERSION SYSTEM

This application is a continuation in part of Ser. No. 07/364,309 filed on Jun. 12, 1989 now abandoned and is a continuation in part of Ser. No. 07/990,071 filed Dec. 14, 1992, now U.S. Pat. No. 5,343,699, and is a continuation in part of Ser. No. 07/755,323 filed Sep. 5, 1991, now U.S. Pat. No. 5,394,852 and is a continuation in part of Ser. No. 08/268,680 filed Jun. 30, 1994 now abandoned, in which the specifications of said applications are incorporated herein as if each were repeated entirely.

This invention relates to a system for converting ordinary engines, fuel cells, and other energy conversion systems to interchangeable operation on fossil hydrocarbons and alternative fuels such as hydrogen, producer gas, natural gas, landfill gas, propane, and fuel alcohols. An engine fueling and control system is disclosed for greatly improving fuel efficiency while providing the option for cleaning the air by reducing exhaust emissions below the ambient level of objectionable contaminants.

BACKGROUND OF THE INVENTION

Modern cities are plagued with problems from internal combustion engines that produce numerous objectionable atmospheric emissions and undesirable application characteristics including:

1. Engines burning hydrocarbons produce substantial volumes of carbon monoxide which is a dangerous poison.
2. Engines burning hydrocarbons produce oxides of nitrogen which combines in sunlight with airborne hydrocarbons to produce ozone and smog.
3. Engines burning hydrocarbons produce gases, vapors, and particulates that cause lung diseases.
4. Engines burning hydrocarbons produce emissions that cause acid rain and corrosion to engine components.
5. Most engines are dedicated to gasoline which is a fossil fuel. Using depletable fossil fuels causes economic inflation, scarcity, deprivation, and social conflict.
6. Efforts to overcome pollution from fossil gasoline and diesel fuels has centered on oxygenated fuels which are prepared by adding one or more alcohols and/or MTBE to gain oxygen for improved combustion. This has proven to offer marginal emissions improvements and remains objectionable because of odors and allergic responses by many to these chemicals.
7. In most cases, engines using oxygenated fuels suffer efficiency losses.
8. Diesel engines produce objectionable emissions of carbon-rich particulates.
9. Rapid application of energy from regenerative braking is a problem for virtually all vehicles including electric battery, flywheel, and engine based propulsion systems.
10. Additional efforts to overcome problems arising from undesirable fuel use in internal combustion engines include adoption of electric batteries and motors for supplying motive power. This approach causes the electricity generation system which is already recognized as the leading burner of fossil fuels and producer of carbon dioxide emissions to increase these undesirable activities.
11. Although oxygenated fuels show some improvement in reducing objectionable emissions more oxygen is needed in the combustion chamber to achieve needed reductions in pollutive emissions.
12. Mufflers represent considerable curb weight and expense while generally causing back pressure and fuel consumption problems.
13. Regenerative conversion of kinetic energy into stored energy during the stopping of a vehicle and efficient application of such stored energy poses difficult problems which are not solved by attempting to generate the compounds found in fossil fuels.
14. Rapid storage of renewable energy such as wind, hydro, wave and biomass energy for later efficient use poses difficult problems which are not answered by attempting to duplicate the generation of compounds found in fossil fuels.

SUMMARY OF THE INVENTION

An object of the present invention is to overcome the problems noted above which have the common denominator of fossil fuels. In accordance with the principles of the present invention, these objectives are accomplished by providing a process for operating a combustion engine to dependably produce products of combustion that are much less objectionable than present operation on gasoline.

An object of the invention is operation with substantially unthrottled air entry into the engine for purposes of increased volumetric efficiency, increased engine efficiency, increased presence of oxygen in the combustion chamber, and increased capacity for cleaning the air of polluted cities and other contaminated areas.

An object of the invention is to provide oxygen from chemical compounds for improved fuel combustion.

An object of the invention is to provide a low-cost, safe, renewable, fuel-supply system.

An object of the present invention is to provide the option for operating existing engines and producing life-sustaining breathable emissions.

An object of the present invention is to provide an oxidant supply such as chlorine, bromine, iodine, or oxygen for multiple uses and functions while supplying a fuel such as hydrogen by electrolysis of electrolytes such as salt water, sea water, water, and various other preparations.

An object of the invention is to provide much greater oxygenation of carbon constituents of hydrocarbon fuels than typical approaches of adding oxygen-containing ingredients such as alcohol and/or MTBE.

An object of the invention is to provide a fueling system that is quieter, more efficient, and safer than conventional approaches.

An object of the present invention is to greatly reduce the apparent area of exposure for degradation of the fuel storage system due to hazards such as collision, fire, corrosion, and projectile penetration.

A object of the invention is to eliminate particulate emissions from Diesel engines.

An object of the invention is to provide a fuel storage and delivery system that withstands severe abuse and exposure to weathering conditions.

An object of the invention is to provide a fueling system that provides fail-safe operational characteristics.

An object of the present invention is to provide a system for converting existing engine types including spark and compression ignition engines to cleaner and more efficient operation.

An object of the present invention is to provide a system for rapid conversion and storage of energy from regenerative braking and, recovery of such energy for useful applications such as a high-efficiency engine, fuel cell, or hybrid vehicle.

These and other objects of the present invention will become more apparent during the course of the following detailed description and appended claims. My invention may be best understood with reference to the accompanying drawings, wherein illustrative embodiments are shown.

BRIEF DESCRIPTION OF THE DRAWINGS

FIG. 6 is a schematic illustration of an embodiment of the invention.

BRIEF DESCRIPTION OF THE PREFERRED EMBODIMENTS

Figure 1:
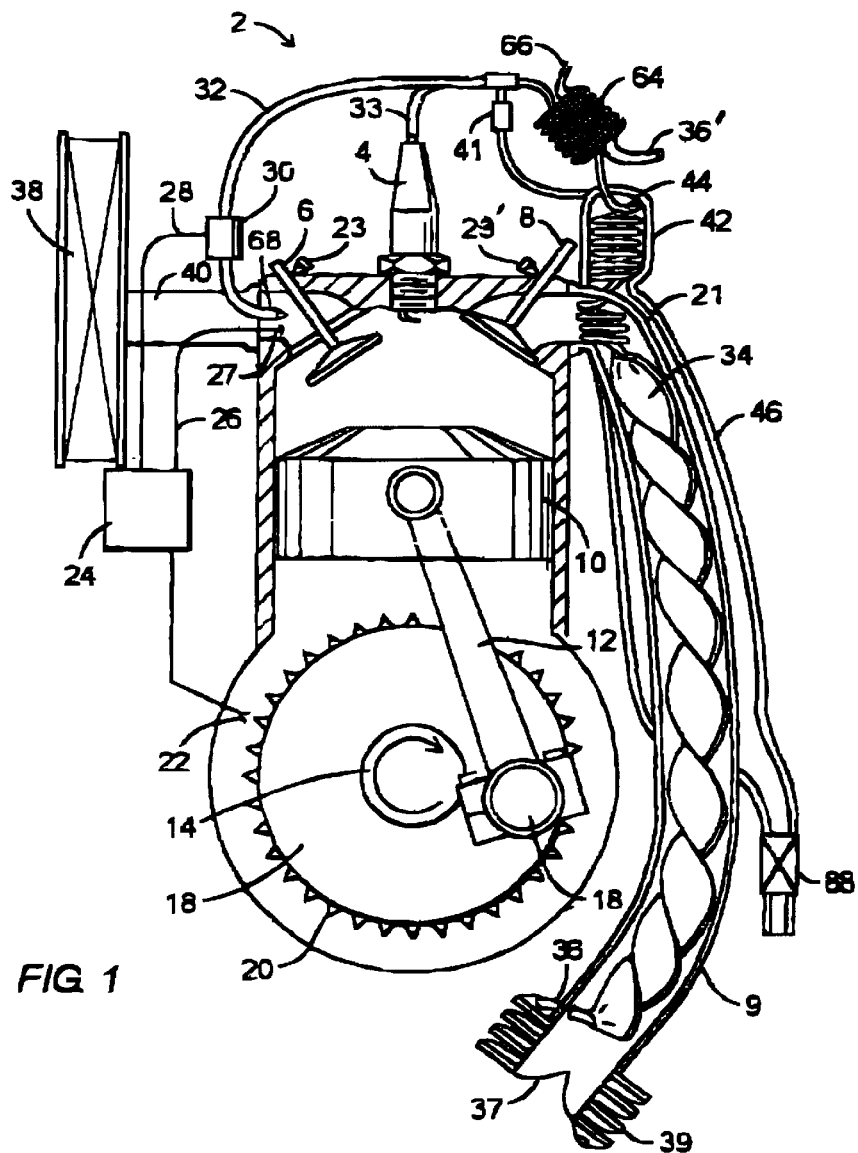
FIG. 1 is a schematic illustration showing components of the invention in application on an engine.

FIG. 1 shows an internal combustion engine with piston 10, connecting rod 12, output shaft 14, crank journal 16, flywheel 18, intake valve 6, and exhaust valve 8 in embodiment 2 of the invention. Control of fuel flow and metering of the fuel according to the desired power level is provided by solenoid valve 30 and/or spark-injector valve 4 which is connected to a suitable fuel supply by conduit 33, in response to electronic controller 24.

A suitable indicator of the piston position and condition of the combustion chamber is provided to controller 24, which receives sensor information input from fuel detector 27 and combustion engine condition detector 22 to control valve 30 through connection 28 as shown by sensor 22 which senses flywheel markers 20 or the positions of the valves by similar proximity sensors 23, or by instrumentation in embodiment 4 as disclosed in my copending patent applications derived from U.S. applications Ser. Nos. 07/990,071, now U.S. Pat. No. 5,343,699, and 08/268,680, abandoned, of reference. Air is preferably filtered with a suitable filter 38 and delivered without throttling by tube 40. Valves 6 and 8 may be operated by any suitable arrangement and timing including electromagnetic actuators, by cam and return springs, and by a roller-cam mechanism.

Ignition of fuel in the combustion chamber may be with a conventional spark plug or with the Superior Materials, Advanced Research, and Technology or "SMART" plugs as shown at 4 and which are described in my co-pending applications of this Continuation In Part Patent Application.

It is preferred to provide a converted engine with SMART plug(s) 4 along with intake air enhancing fuel injection through nozzle 68 for purposes of increasing the specific power production capabilities on demand. Start up, low-speed, and cruise operations are preferably with stratified charge operation with SMART plug 4. Acceleration and maximum power operations are preferably with the combination of injection by 30–68 and Smart plug 4.

Diesel engines are more expensive and heavier than low-compression, spark-ignition engines. Although Diesel engines are generally selected because of superior fuel economy, they are generally objectionable because of carbon-rich particulate emissions. My invention converts Diesel engines for use with hydrogen and other clean fuels which eliminates particulate emissions while retaining high fuel economy. My invention also allows low-cost, light-weight engines to be readily converted to operation with unthrottled air entry for important increases in fuel economy, engine life, and reduced emissions.

Further improvements are achieved by operation of the engine on a combination of fuel delivery options to meet conditions such as start up, low-speed operation, cruise, synchronous drive, and maximum power conditions. Following conversion Diesel and spark-ignition engines can use fuels that are less expensive and which are not subject to compression ignition.

Fuels containing free hydrogen and or fuels with a similar wide range of combustible fuel-air mixtures are preferred for purposes of allowing unthrottled air entry into the engine. Hydrogen can be spark ignited in fuel-air ratios ranging from approximately 4% to 74%. This allows mixtures of hydrogen and fuels with narrow combustible limits of fuel-air ratios to be utilized in the present invention without the efficiency loss associated with air throttling.

It is preferred in many transportation and cogeneration engines to convert a portion of the primary fuel into hydrogen by thermochemical reactions. In operation heat is gained from waste heat sources such as the exhaust gases of the engine and added to a mixture of primary fuel with water as illustrated by the following general reaction.

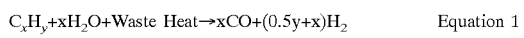

$$C_xH_y + xH_2O + \text{Waste Heat} \rightarrow xCO + (0.5y+x)H_2 \qquad \text{Equation 1}$$

The products of the general reaction of Equation 1 are called "engine fuel" and generally yield 15% to 30% more energy upon combustion than the primary fuel and contain substantial amounts of a fuel with a wide range of combustible fuel-air ratios such as hydrogen. The endothermic reaction in which waste heat is recovered to supply the majority of the endothermic energy input accounts for the increase in heat release of the engine fuel constituents. This process enables energy from off-peak power supplies, regenerative braking, exhaust gases, and cooling systems to be gainfully applied to fuel economization. Engine fuel burns in much leaner air-fuel mixtures than primary fuel which allows further fuel economization and unthrottled engine operation.

Figure 2:
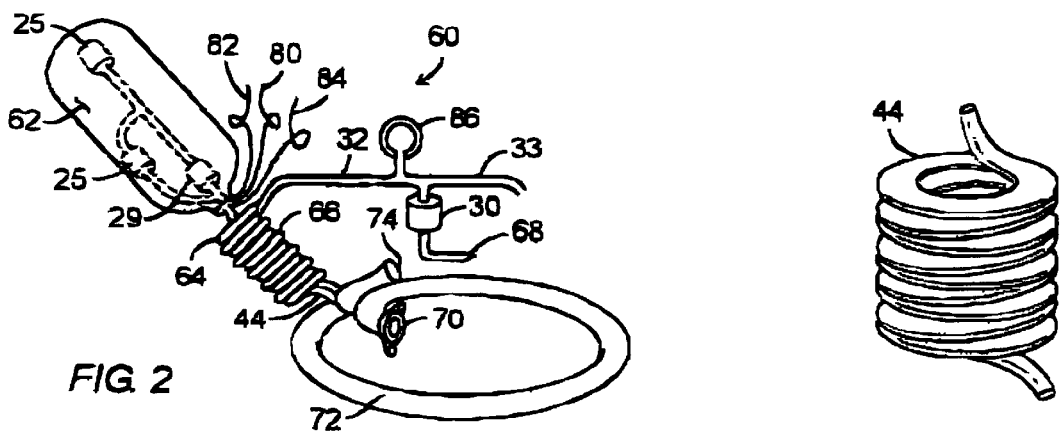
FIG. 2 is a schematic illustration of a device constructed in accordance with the principles of the present invention.

As shown in embodiment 60 of FIG. 2, a fuel such as natural gas and water can be loaded into pressurized cylinder 62. Water solutions with hydrocarbons such as methane, naphtha and gasoline are generally prepared with surface active agents that bond water molecules to hydrocarbons. Other suitable methods of providing proportional delivery of fuel and an oxygen donor include the use of solenoid operated inlet valves 25 which are adaptively driven by controller 24 to deliver approximately stoichiometric proportions of fuel and oxygen donor from storage 62 to reactor 64.

Water admitted with hydrocarbons produces vapors that are miscible with methane and other constituents of natural gas in the confines of engine-fuel reactor 34 which is located within the exhaust stream of a heat engine or other heat-rejecting source. It is preferred to locate reactor 34 within exhaust pipe 9 for the purpose of extracting as much heat as possible from the exhaust gases. It is desirable to achieve the highest possible operating temperature in 34 by replacing the typical muffler and catalytic reactor by providing 34 as a noise attenuation device that muffles noise in the exhaust stream, cooled exhaust gases are finally delivered to flow distributor and smoother 37 which provides smooth transition to radial passage of exhaust gases through the exit gaps between circumferential fins 39. This combination of cooling the exhaust by 34 and radial distribution to the atmosphere by 37 and fin(s) 39 quiets exhaust noise to a greater extent than typical mufflers while providing less back pressure on the engine and this is accomplished with much less overall weight than typical muffler systems require.

In instances that the temperature achieved by exhaust heat exchanger 34 within the exhaust stream in 21 is not adequate to provide the desired engine-fuel production rates, further heating may be accomplished by electric resistance heating of 34 and/or 44 or by using a suitable fuel in a catalytic or flame heat release within 42 to achieve the temperature desired within reactor 44. At times when supplemental heat is needed, it is preferred to combust a portion of the engine fuel produced by the thermochemical reaction and delivered as needed by solenoid valve 41 which is controlled by 24 but electrical heating of 44 may also be used as needed and until a steady supply of engine fuel is available. When needed, air or a portion of the air-rich exhaust gas from the engine is allowed to enter 42 from coaxial tubing 46 to supply oxygen for combustion of fuel within 42 and the exhaust gases from 42 are taken to the atmosphere after heating and/or insulating remaining exhaust gases within in 21 as shown.

Suitable methods for controlling the passage of air and/or exhaust gases from the engine to 42 include placement of 42 within the exhaust stream in 21 (not shown) and allowing 42 to remain open to exhaust entry from the engine as a series or parallel path for exhaust travel, restriction of flow with a poppet, sleeve, or other suitable valve 88 located at the cooler end of the exhaust system as shown, the use of a pump (not, shown), and utilization of cyclically pressurized air in the crank-case due to piston motion.

Figure 4:
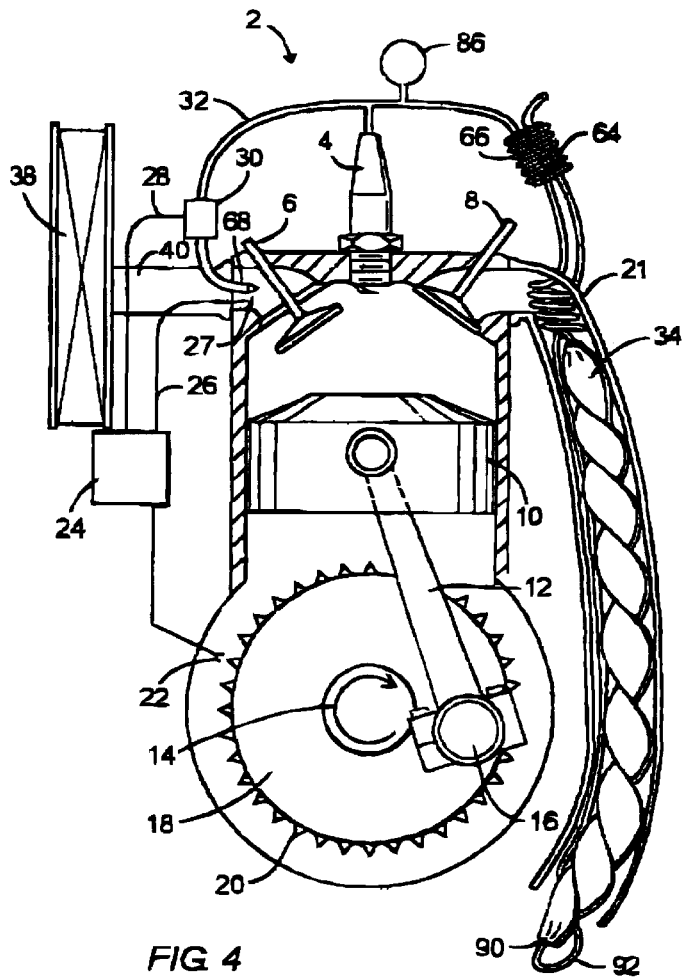
FIG. 4 is a schematic illustration of the invention.

In the instance that electrical heating is utilized it is preferred to use electricity produced by regenerative braking. As shown in FIG. 4, accumulator 86 is sized to store engine fuel produced by regenerative braking and for cold starts of the engine. Reactor 44 may be provided with considerable heat storage capacity for purposes of being heated by electrical resistance or by induction before the engine is started and during regenerative braking. Suitable materials for storing heat in 44 include graphite, boron nitride, boron carbide, and similar high specific heat materials. It is preferred to utilize a heat conserving configuration 34 such as the system shown in FIG. 5 for reactor 44.

Preheating 44 with inexpensive off-peak and/or cogenerated electricity is especially useful for reducing the fuel cost for short range trips. Rapid-input heating of 44 with regenerative braking is especially helpful in reducing fuel costs in stop-and-go driving cycles. Utilization of a small portion of the engine fuel to achieve the desired temperature for thermochemical production of engine fuel is particularly helpful in reducing fuel costs for extended-cruise operation in which the engine is operated at very lean air-fuel ratios and the exhaust is relatively cool.

Heat exchanger delivery tube 64 is preferably constructed as dual layers of flat tubing twisted to cause the fluids passing therein to have agitated and/or turbulent contact with the walls of the tubing. Cool fuel and water flows countercurrent through 64 towards the engine to pre-cool engine fuel exiting from thermochemical reactions in 34 and/or 44. Engine fuel is produced in tubes 34 and 44 which are preferably flattened tubes with catalytic material provided on inner surfaces. Table 2 lists some suitable catalysts. Tube 34 is preferably twisted and placed in the exhaust system of the engine as shown in FIG. 1 to perform exhaust noise attenuation and thermochemical regeneration functions.

It has been found helpful to experimentally vary the lead of the helical twist and to vary the air velocity by changing the cross sectional area and width of flat tube assembly 34 for purposes of increasing heat transfer and reducing engine exhaust noise. This results in an exhaust system with lower production cost to achieve the same degree of noise attenuation, reduced back pressure, and the ability to host engine-fuel production from waste energy sources.

In many instances it is desired to utilize the invention in a hybrid vehicle and to run an engine and/or fuel cell on hydrogen. In this instance, it is preferred to separate engine fuel into two streams as shown by embodiment 200 in FIG. 6. Fuel and oxygen donor enters heat exchanger 64 from conduit 63 as shown to cool hot engine fuel from reactor and heat exchanger 204 which is the final heater after exchanger-reactor 34 preheats the reactants as much as possible with waste heat and/or regenerative heat. Any source of waste heat or low cost heat may be used for exchanger 34 such as exhaust heat from a heat engine in exhaust pipe 11. Engine fuel produced in circuits 66, heat exchangers 204 and 34 is separated into hydrogen and carbon monoxide by selective membrane 206 which allows hydrogen to pass into collector annulus 207 as shown and to exit to accumulator 214 for delivery to 216 as needed to operate a fuel cell, engine, or other suitable application. Suitable membranes for 206 include conventional palladium-silver alloys, palladium, iron-titanium-copper alloys, and ceramics designed to pass hydrogen and not carbon monoxide or other larger species of engine fuel.

Engine fuel rich in carbon monoxide exiting 206 is taken by tube 208 to accumulator 210 for delivery as noted above to combination heat exchanger and reactor 204/203 or by conduit 215 as a carbon monoxide enriched supply for chemical uses or to a burner or as an engine fuel to a heat engine. Sufficient carbon monoxide may be routed to 204 for combustion and heat release to drive engine fuel reactions in 203 at a higher rate. Oxygen for carbon monoxide combustion is preferably from hot exhaust gas with excess air. Exhaust from carbon monoxide combustion may be added to the exhaust gases in 11 as shown.

If turbocharging of an engine or supplying air to electrodes of a fuel cell is desired, this is facilitated by operation of a gas motor 220 to drive an air pump 222. It is preferred to extract mechanical work after final heating of engine fuel in reactor exchanger 204 as shown. Suitable gas motors include gas turbines and positive displacement designs. Similar gas motors may be applied to power an electric generator 205 for producing electricity in a combined cycle or hybrid application.

In operation, hydrogen assuredly ignites even at very lean mixtures and causes the burning of other fuel constituents that are present even though without the presence of hydrogen for such ignition the other fuel constituents would not burn. Preferably the other fuel constituents are admitted at lean fuel-air ratios to improve the operating efficiency, reduce the peak combustion temperature to the point that nitrogen monoxide is not formed, and to greatly reduce all other emissions including carbon monoxide, carbon dioxide, hydrocarbons, and particulates.

In order to utilize fuels such as hydrogen that are prone to backfiring, fuel is delivered at a suitably regulated pressure to normally closed valve 30 which is only opened to allow fuel flow on start up of the engine after a suitable frequency of rotation is indicated by sensor 22. This enables a steady pulsating flow of air into the engine to be established and fuel is delivered by nozzle 68 at the point shown which aids air entry into the combustion chamber when intake valve 68 is open. Pulsing the injection of fuel from 68 towards the open valve port of the combustion chamber amplifies the pressure waves of air traveling into the combustion chamber and enhances the air breathing efficiency of the engine. This results in the delivery of increased oxygen to the combustion chamber.

Sensor 26 is preferably placed with the substance detector 27 adjacent to or behind nozzle 68 to sense the presence of hydrogen and/or one or more constituents of vaporous engine fuel. If these substances are sensed in fuel-air ratios that support combustion at the location of sensor detector 27, valve 30 causes reduced flow of fuel through nozzle 68. Depending upon the optimization goals of adaptive controller 24, this may be accomplished by: momentary shut-off of 30, reducing the delivery pressure to 30, and/or reducing the on-time of normally closed valve 30. In many applications such as lawnmower engines if sensor 26 indicates the presence of a combustible fuel-air ratio, it is preferred to completely halt fuel flow through 68 until the piston has completed a full cycle of intake, compression, power, and exhaust events which assures that no backfiring of fuel accumulated in 40 Will occur. The engine is then returned to normal start-up and/or operation so long as sensor 26 does no t indicate that fuel has backed up into the location that sensor element 27 is placed.

In many small engine designs it has been found to be satisfactory to allow fuel to flow into the engine's intake port area at all times that the engine is turning above a predetermined minimum and power production is desired. In larger engines where optimization of power production and fuel efficiency are more important it is preferred to intermittently flow fuel through nozzle 68 with the flow pulses adaptively optimized to produce the greatest fuel economy by allowing fuel to spray substantially at times just before and when the intake valve is open. Fuel flow is stopped by 30 before the intake valve 6 closes. This allows the fuel momentum to be utilized to force more air into the combustion chamber. It is also preferred to cool engine fuel with the counter-current heat exchanger circuit 66 to 64 shown in FIG. 2 and to cause the fuel to expand upon entry thereby cooling the air for purposes of forcing more air into the combustion chamber.

As shown in FIG. 2, it is a preferred configuration to enter exhaust gases into the exhaust pipe at 70 and to enter preheated fuel from 64 into tube section 34 at a point 36 near the final release of exhaust gases to the atmosphere from 72 at 74. The hottest point of reaction tube 34 is near the engine as shown. As shown in the circuit of FIG. 1, it is preferred to provide functional connection from point 36 to point 36' to convey fluids exiting from countercurrent heat exchanger 66 to countercurrent heat exchanger and engine-fuel reactor 34 as shown.

Engine fuel may be produced from any hydrocarbon such as landfill methane and water by the following reaction:

$$CH_4 + H_2O \rightarrow CO + 3H_2 \qquad \text{Equation 2}$$

The hot engine fuel is cooled after exiting tube reactor 34 by further counter-current flow in heat exchanger tube 66 as energy is transferred to entering fuel in tube 64. Cooled fuel is delivered by fuel lines 32 and 33 and controlled by solenoid valve 30 and delivered by nozzle 68 and/or to SMART plug 4 as previously described for purposes of adaptively optimizing the operation of the engine type for the purposes of the chosen duty cycle to which my invention is applied.

The configuration of FIG. 2 is also preferred for conversion of fuel alcohols such as wood alcohol or ethanol to engine fuel. Equation 3 shows the process for methanol.

$$CH_3OH + \text{Waste Heat} \rightarrow CO + 2H_2 \qquad \text{Equation 3}$$

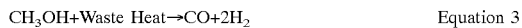

Several other typical reactions for producing engine fuel are shown in Table 1. FIG. 2 shows the preferred configuration for small engines in which the exhaust pipe is fitted with a noise-attenuating helical twist tube 34 as described and is curved as shown to surround the engine or to otherwise fit in the application with a curvilinear exhaust pipe for purposes of enhancing heat-exchange operations that are induced by turbulence.

Figure 7:
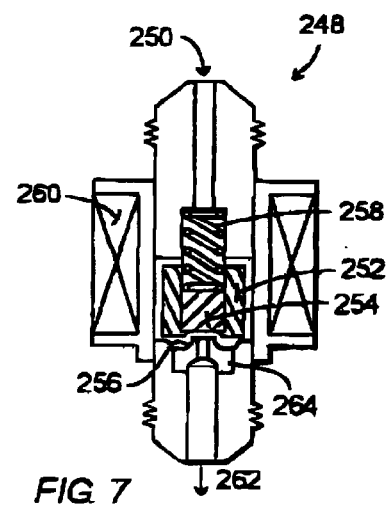
FIG. 7 is a schematic illustration of an embodiment of the invention.

FIG. 7 shows the preferred embodiment 248 for valve metering operation within 4, 30, and 41. Fuel is delivered to port 250 and thus to moveable poppet 252 which incorporates a moveable but captured elastomeric seal 254 as shown. Seal 254 is urged against port 256 by spring 258 and the fuel pressure. Solenoid coil 260 is wound with insulated wire to cause a magnetic attraction of 252 when it is desired to meter fuel through the valve to port 262.

It is preferred to make elastomeric seal 254 from an inert elastomer such as fluorosilicone, Viton or Kelrez resin at a hardness of about 90 durometer. In operation, moveable seal 254 is urged to the face of orifice 256 by spring 258 and is able to conform to the face of 256 by the fuel pressure. Any wear on elastomeric seal 254 is compensated by moving it towards the face of 256. Particles that may momentarily pass between 254 and 256 are accommodated without denting or harming these critical surfaces because spring 258 allows 254 to move away from 256 until such particles are carried clear of the face of 256. This enables the valve to provide bubble-tight sealing capabilities for billions of valve cycles without detectable changes due to wear, fatigue, or other damage.

Corrosion of critical components of embodiment 248 is prevented by the embodiment of FIG. 7 by virtue of the use of insulating elastomeric member 254 in contact with 256 which is preferably a dense alumina or glass insert 264 as shown. This overcomes the difficult problems of galvanic and oxidation-potential corrosion or cranny corrosion of metallic components that often fail during storage due to corrosion cells that are developed.

In applications that require compact storage of an oxygen donor for the preparation of hydrogen and carbon monoxide it is preferred to use compounds such as hydrogen peroxide in the thermochemical regeneration system. Illustratively for a hydrocarbon such as methane the reaction becomes:

$$2CH_4 + H_2O_2 + \text{Waste Heat} \rightarrow 2CO + 5H_2 \qquad \text{Equation 4}$$

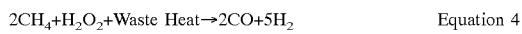

The hydrogen peroxide can be used in virtually any mixture with water in the type of reaction given in Equation 4. It cold outdoor applications it is advantageous to add a soluble substance, such as ethanol or methanol to depress the freezing temperature. Catalysts such as chromium, iron, nickel, and copper are helpful in reducing the size and mass of the reactor for processes similar to that of Equations 4 and 10 of Table 1.

As noted in Equations 1, 2, 3, and 4, oxygenation of the carbon in the fuel to carbon monoxide is a major feature of the on-board engine fuel production feature of the invention. By preparing carbon monoxide from larger fuel molecules before the fuel enters the combustion chamber the oxygen gain is much larger than with additions of alcohol and/or MTBE. Even more important is the fact that an oxygen atom is already attached to each individual carbon atom which assures extremely high chemical availability and further oxidation to carbon dioxide without formation of particulates. It is particularly important to gain this assured chemical availability of the carbon and to gain more heat where it is needed at the time that it is needed in the combustion chamber. Engine fuel produces 15% to 30% more heat than the hydrocarbon from which it is produced. Engine fuel burns a least seven times faster than the hydrocarbon fuel and thus releases more heat at the time that it does the most good in the power stroke of the engine.

Carbon compounds are the culprits of most pollution. Carbon monoxide is readily produced and converted to carbon dioxide by the excess-air, hydrogen-promoted combustion characteristics of the invention virtually assuring freedom from carbon monoxide, particulates, and hydrocarbon emissions. Carbon monoxide burns in a wider air-fuel ratio than most hydrocarbons and the presence of carbon monoxide in engine fuel facilitates high-efficiency engine operation with unthrottled air entry.

As shown in FIGS. 1 and 2, assured safety from carbon monoxide poisoning and engine backfiring is provided by sensor 26 and detection element 27 which causes normally closed valves 29 and 30 to remain closed if carbon monoxide and/or hydrogen is detected at 27 or if sensor element 27 is inoperative. However, the engine may remain operative in this fail-safe instance by fuel injection through SMART plug 4.

In instances that it is preferred to have no carbon compounds such as carbon dioxide produced from fuel combustion it is preferred to load tank 62 with a carbon-free fuel such as ammonia or pure hydrogen or a mixture of such fuels. In applications utilizing ammonia, the inner tube catalyst layer of reaction tube 34 provides rapid conversion of ammonia to nitrogen and hydrogen as shown in Equation 5.

$$2NH_3 + \text{Waste Heat} \rightarrow 3H_2 + N_2 \qquad \text{Equation 5}$$

In addition to the safety features provided by controller 24 in response to sensor 27 and engine rotation sensor 22, it is preferred to provide a normally closed excess flow valve 29 within tank 62. This placement of valve 29 within 62 protects valve 29 from impact and other degrading factors that have proven to be problematic with previous approaches. Valve 29 is actuated by flow in excess of a preset value that has been determined to be adequate for all portions of the duty cycle of the engine, fuel cell, or other receiver of hydrogen provided from tank 62. It is preferred to incorporate a flow rate sensor within valve 29 and to operate valve 29 as a normally-closed solenoid-operated valve. Insulated leads 80 and 82 supply electrical energy from controller 24 to operate valve 29 and cable 84 supplies instrumentation information such as the pressure, temperature, and flow rate from tank valve 29 to controller 24.

Figure 3:
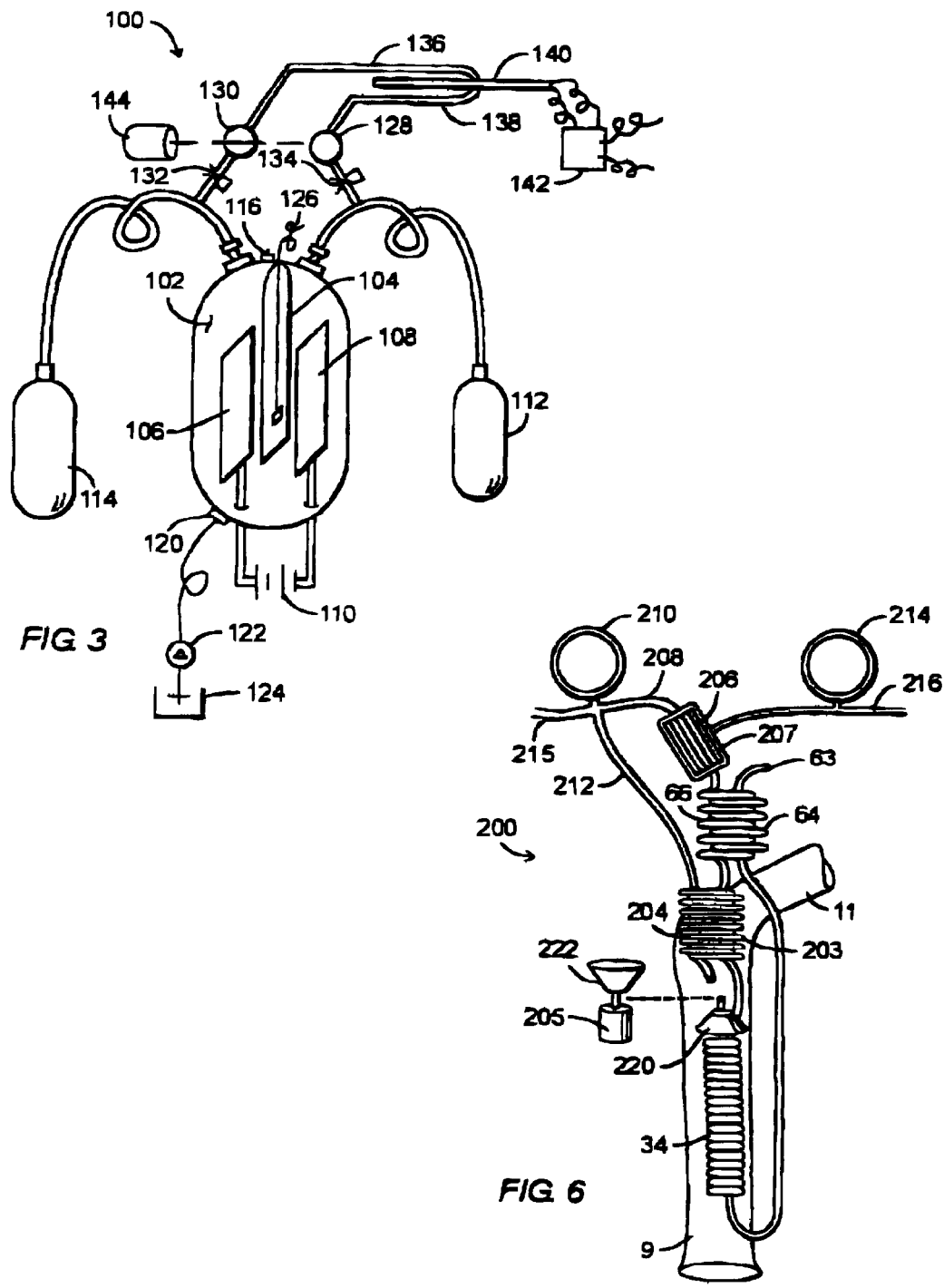
FIG. 3 is a partially sectioned view of a system for accomplishing the principles of the present invention.

In instances that the invention is used in mobil applications such as lawn mowers, weed eaters, portable engine-generator sets, motor vehicles, etc., it is preferred to construct tank 62 as a fiber reinforced composite cylindrical tank with spherical ends. Illustratively, a tank approximately four inches in outside diameter with half-inch walls of densely wrapped carbon fiber of approximately $1 \times 10^6$ psi tensile yield strength provides pressure testing at 7,000 atmospheres and storage of hydrogen at 4,000 atmospheres pressure which is delivered without a mechanical compressor by electrolysis of water by fuel cell and electrolyzer system 100 which includes hydrogen electrode 106, oxygen electrode 108, feed stock connection 120, feed pump 122, and feed stock supply 124 as shown in FIG. 3. Quiet and vibration-free delivery of directly pressurized supplies of hydrogen without requirements for a mechanical compressor with three or four stages greatly simplifies the fuel system for virtually any application in which compact storage of hydrogen is needed. The embodiment of FIG. 3 can be incorporated into a vehicle such as a hybrid vehicle to allow recovery of stopping energy as kinetic energy is used to produce electricity (which cannot be stored) but which is efficiently converted to compact stored hydrogen by 100. This embodiment of the invention particularly facilitates broad applications in cogeneration, off-peak energy storage, and hybrid vehicles.

It is preferred to provide containment tank 102 with an inner liner of aluminum or injection blow molded polymer such as polypropylene or polybutylene and to wrap carbon fiber which has been coated with suitable epoxy for adhering the composite into a densely packed reinforcement. It is preferred to coat the carbon fiber reinforcement of tanks 62 and 102 with about 0.90" layer of high strength glass fibers and to apply an ablative heat resistant coating over the glass fibers. A suitable heat-resistant ablative coating for this purpose is the CTG coating system supplied by Nelson Firestop Products of Tulsa, Okla. It is preferred to coat the cured CTG material with a white ultraviolet-blocking latex acrylic coating for preserving the system against degradation due to exposure to sunlight.

As shown in FIG. 3, electrolyzer 102 is a heavy-walled composite cylinder with spherical ends of similar construction as shown and is capable of withstanding internal pressures of 7,000 atmospheres or more. Electrolyzer 102 may use proton exchange semipermeable membrane or it be charged with a suitable electrolyte such as potassium hydroxide and additions of water may be made through a suitable fill port such as 116. In this mode of operation, a suitable receiver cylinder 62 or 112 is connected as shown to be filled to 4,000 atmospheres pressure with hydrogen.

Oxygen is produced at equal pressure and added to receiver 114. Upon conversion of water to hydrogen and oxygen the liquid level declines to the point of being detected at the low liquid limit by sensor 126 which may be located in any suitable place such as shown on gas separator partition 104. Upon reaching the low liquid limit power supply 110 is turned off and the pressure within 102 is relieved to allow refilling the vessel with water. In instances that more continuous electrolysis operation is desired, a suitable pump 122 can be used to recharge water into 102.

A particularly efficient energy conversion system is provided by converting a suitable form of energy such as the kinetic energy of stopping a vehicle or renewable solar, wind, hydro, or wave energy to electricity for electrolysis in 102, storing high pressure oxygen in 114 and high pressure hydrogen in 112. When recovery of stored energy is needed, hydrogen and oxygen are allowed to flow through pressure regulator valves 132 and 134 to expand in fluid motors 128 and 130 to do work or turn a generator 144 to produce electricity. Oxygen exhausting from motor 130 is used in a further energy-conversion device such as a partial-oxidation reactor to perform the processes of Equation 6 and/or 7, heat engine 2, and/or by suitable connections 138 and 136 as illustrated to fuel cell 140 which is shown as an alternative to a heat engine or combustion device. Hydrogen exhausting from expansion motor 128 is delivered to a suitable burner, heat engine, or fuel cell 140 as shown. In the instance that fuel cell 140 is utilized, the direct current produced may be delivered to invertor and transformer 142 to produce the voltage and frequency of alternating current that is desired.

A vehicle fueling system for quick production of fuel from wind, hydro, solar, or regeneration of vehicle stopping energy along with compact storage and rapid availability of clean fuels for energy conversion applications can apply the present invention in numerous ways including the use of oxygen produced by electrolysis to partially oxidize a suitable hydrocarbon to produce Engine Fuels such as hydrogen and carbon monoxide or hydrogen as shown in Equations 6 and 7.

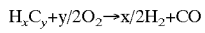
$$H_xC_y + y/2O_2 \rightarrow x/2H_2 + CO \qquad \text{Equation 6}$$

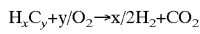
$$H_xC_y + y/O_2 \rightarrow x/2H_2 + CO_2 \qquad \text{Equation 7}$$

One particularly useful application of the process summarized by Equation 6 is to provide supplemental heating of 44 by addition of oxygen to hydrocarbon fuels that have been preheated. The hydrogen released by electrolysis or partial oxidation reactions typical to those given above and in Table 1, can be pressurized by initial pressurization of the reactants or by collecting the hydrogen in a suitable receiver media such as a hydride or microspheres and then heating the receiver media to release the hydrogen to the pressure tank at the desired higher pressure.

My invention's operation of producing and storing dense hydrogen at nominal pressures of 4,000 atmospheres greatly reduces dangers due to hazards such as collision, fire, or projectile damage in comparison with storage at lower pressure in larger vessels of weaker construction or as a cryogenic liquid. The relatively thin frail vessels that are conventionally used to produce and store flammables such as hydrogen are much more subject to damage by collision, fire, and projectile penetration than the thicker, stronger, and more fire-resistant vessels of the present invention.

The apparent size or cross section of the high pressure tank embodiment of the invention is five-times smaller than the apparent area or cross section of a conventional tanks offering the same fuel delivery. This size reduction provides tremendous improvement in the ability to safely store hydrogen in protected locations that conventional tanks would not fit. The tank embodiment of the invention will safely withstand extended exposure to harsh sunlight, 100,000 full pressurization and release cycles, the blast impact from two full sticks of dynamite, an attack with a 0.44 magnum pistol, and a burn test that produces 1,500° F. surface temperature. After these severe and extensive endurance, fatigue, impact, and fire safety tests, the tank embodiment will still pass a pressure test at 5/3 working pressure for safe conveyance on public highways.

In case of a tubing or component failure downstream of the tank, excess flow is sensed and within a few milliseconds and flow of fuel is halted by closure of valve 29. Similar fail-safe results are achieved if the electrical leads 80 and/or 82 are severed and fail-safe shut down can be produced by utilizing a switch in either lead which opens if the seat belt or air bag impact sensors are activated. In applications requiring minimum curb weight and compactness it is preferred to provide electrical heating components and/or controlled flow of surplus-air exhaust gases to support catalytic or flame combustion of fuel within a central space 90 of formed layers of assembly 34 as shown in FIGS. 4 and 5.

Figure 5:
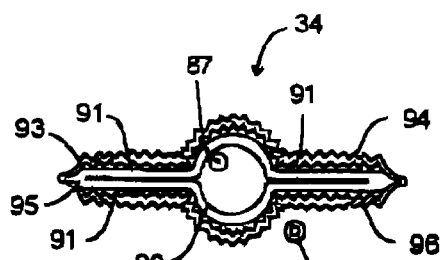
FIG. 5 is a partial cross section of an embodiment of the invention.

In this embodiment engine fuel is produced within serpentine corrugations 91 formed longitudinally into tube layers 94 and 96 which are joined at the edge of each corrugation to inner layers 93 and 95 as shown in the cross section of FIG. 5. Exhaust gases from auxiliary heating of 34 are confined within 90 as is resistance heater 87 as shown in FIG. 5. Inner layers 93 and 95 are preferably formed from heat-resisting ferrous alloys or from higher specific heat materials such as silicon carbide or aluminum nitride for applications requiring higher heat storage capacity. It is preferred to seal the outside edges of 94 to 96 and to provide occasional cross-feed channels within the corrugation channels as shown for purposes of assured delivery of engine fuel.

In applications designed to quickly store regenerative braking energy, 93 may be a high specific heat material such as stabilized boron carbide, boron nitride, beryllium oxide, silicon carbide, or siliconized graphite and 95 a selection for higher heat conduction such as a steel superalloy. Heat exchanger 64–66 cools engine fuel to near ambient as water and precursor fuel is heated for delivery through 92 to 34 as shown.

It is possible to convert most ordinary homogeneous charge engines to operation on the principles of the present invention and achieve fuel efficiencies of comparable Diesel engines with stratified charge operation.

Diesel engines achieve superior fuel economy because of the following factors:

1. Unthrottled air entry;
2. Far excess air lean combustion during most operating conditions;
3. Heat-conserving stratified-charge fuel combustion within excess air;
4. Fast fuel combustion due to high compression conditions.

My invention allows lower compression ratio engines to achieve:

1. Unthrottled air entry;
2. Far excess air lean combustion during most operating conditions;
3. Heat-conserving stratified-charge fuel combustion within excess air;
4. Fast fuel combustion due to the high flame speed of engine fuel constituents such as hydrogen and/or carbon monoxide;
5. In addition, lower compression engines generally have smaller bearings and less ring drag which results in lower friction and parasitic losses.

SUMMARY, RAMIFICATIONS, AND SCOPE

Ordinarily, internal combustion engines are characterized either as expensive, heavy-weight Diesels or low-cost engines that use spark ignition of homogeneous-charge fuels in which speed and power control is provided by throttling the inlet air. My invention allows low-cost, light-weight engines to be readily converted to operation with unthrottled air entry for important increases in fuel economy, engine life, and reduced emissions. Further improvements are achieved by operation of the engine on a combination of fuel delivery options to meet conditions such as start up, low-speed operation, cruise, and maximum power conditions. Low cost engines can achieve diesel fuel economy, greater power production on demand, and much lower exhaust emissions. My invention can greatly improve fuel economy and reduce emissions in some 500 million existing engines that use spark plugs. My invention can also be applied to most existing Diesel engines by substitution of the fuel injector with a SMART plug which results in the ability to operate with a much wider selection of fuels including fuels that are less expensive and which are not subject to compression ignition. My invention allows quick and efficient conversion of kinetic energy of stopping a vehicle or renewable energy such as solar-, wind-, wave-, or hydro-electricity into densely storable quantities of hydrogen and oxygen for quick and efficient development of heat, partial-oxidation processes, shaft power and/or electricity as needed.

It thus will be understood that the objects of this invention have been fully and effectively accomplished. It will be realized, however that the foregoing preferred specific embodiments have been shown and described for the purpose of illustrating the functional and structural principles of this invention. These preferred descriptions are subject to change without departure from such principles. Therefore, my invention includes all modifications encompassed within the spirit, scope, and legal equivalences of the following

TABLE 1

ENGINE-FUEL PRODUCTION

| REACTANTS | FEEDSTOCKS | ENGINE-FUEL | |
|---|---|---|---|
| Hydrocarbon-$H_2O_2$ | $C_xH_y + 0.5xH_2O_2 \rightarrow$ | $xCO + 0.5(y + x)H_2$ | Eqn. 10 |
| Methanol-Ethanol: | $CH_3OH + C_2H_5OH + H_2O \rightarrow$ | $3CO + 6H_2$ | Eqn. 11 |
| Methanol-Allyl Alcohol: | $CH_3OH + C_3H_5OH + 2H_2O \rightarrow$ | $4CO + 7H_2$ | Eqn. 12 |
| Methanol-Propanol: | $CH_3OH + C_3H_7OH + 2H_2O \rightarrow$ | $4CO + 8H_2$ | Eqn. 13 |
| Methanol-Butanol: | $CH_3OH + C_4H_9OH + 3H_2O \rightarrow$ | $5CO + 10H_2$ | Eqn. 14 |
| Ethanol-Amyl Alcohol: | $C_2H_5OH + C_5H_{11}OH + 5H_2O \rightarrow$ | $7CO + 14H_2$ | Eqn. 15 |
| Methanol-Phenol[2]: | $CH_3OH + C_6H_6O + 5H_2O \rightarrow$ | $7CO + 10H_2$ | Eqn. 16 |
| 144-Proof Ethanol: | $C_2H_5OH + H_2O \rightarrow$ | $2CO + 4H_2$ | Eqn. 17 |
| "Black" Methanol (130-Proof): | $C + H_2O + CH_3OH \rightarrow$ | $2CO + 3H_2$ | Eqn. 18 |
| Methane-Steam: | $CH_4 + H_2O \rightarrow$ | $CO + 3H_2$ | Eqn. 19 |
| Gasoline-Wet Methanol[3]: | $C_8H_{18} + CH_3OH + 8H_2O \rightarrow$ | $9CO + 19H_2$ | Eqn. 20 |
| Diesel-Wet Methanol: | $C_9H_{20} + CH_3OH + 9H_2O \rightarrow$ | $10CO + 21H_2$ | Eqn. 21 |
| Cyanoacetic Acid[4] | $C_3H_3NO_2 + H_2O \rightarrow$ | $3CO + 2.5H_2 + .5N_2$ | Eqn. 22 |
| Ammonia | $2NH_3 \rightarrow$ | $N_2 + 3H_2$ | Eqn. 23 |
| Ammonium Hydroxide[5] | $2NH_4OH \rightarrow$ | $N_2 + 3H_2 + 2H_2O$ | Eqn. 24 |

NOTES:
[1]Equation 11 illustrates the opportunity to utilize greater biomass alcohol yields such as methanol from destructive distillation of ligno-cellulosic materials and fermentation of starches. Considerable water can be left in the crude alcohols to reduce refining costs.
[2]Typical to the variety of compounds in partially-refined biomass and coal-tar fuels.
[3]"Gasoline" typical to a mixture of components such as undecane, decane, nonane, octane, heptane, hexane, pentane, benzene, toluene, and (occasionally) fuel alcohols.
[4]Typical to the variety of cyanocarbons and cyano-organic compounds.
[5]Typical to the variety of ammonium compounds.

TABLE 2

CATALYTIC MATERIAL SYSTEMS

| BASE mat'l | CAT. mat'l | Ni* | Ag* | Cu* | Zn* | Sn* | Si* | Mg* | Cd* | Al* | T.S. PSI | Y.S. PSI | ELG. % | Melt °F. |
|---|---|---|---|---|---|---|---|---|---|---|---|---|---|---|
| — | Alloy Sheet | — | 95% | 5% | — | — | — | — | — | — | 30000 | 10000 | 40 | |
| — | Alloy Sheet | — | 80% | 20% | — | — | — | — | — | — | 38000 | 12000 | 52 | |
| — | Alloy Sheet | — | 70% | 30% | — | — | — | — | — | — | 40000 | 11000 | 85 | |
| — | Alloy Sheet | — | 70% | 28% | 2% | — | — | — | — | — | 53000 | 22000 | 63 | |
| — | Alloy Sheet | — | 60% | 35% | 1% | 1% | — | — | 3% | 58000 | 25000 | 45 | | |
| Fe*2 | Hot Dip Coat | — | 57% | 42% | 1% | — | — | — | — | — | — | — | — | 1640 |
| Cu*3 | Hot Dip Coat | 45% | 15% | 16% | — | — | — | 24% | — | — | — | — | — | 1135 |
| Al*4 | Hot Dip Coat | | 3% | 6% | — | 5% | 60% | — | 25% | — | — | — | — | 940 |
| Fe | Hot Dip Coat | 7% | 48% | 38% | 1% | 1% | 1% | 2% | 2% | | | | | 1485 |
| Fe*1 | Hot Dip Coat | 10% | 60% | 25% | | | | | | | | | | 1205 |
| Fe | Plate | 95% | | | | | | | | | | | | |

TABLE 2-continued

CATALYTIC MATERIAL SYSTEMS

| BASE mat'l | CAT. mat'l | Ni* | Ag* | Cu* | Zn* | Sn* | Si* | Mg* | Cd* | Al* | T.S. PSI | Y.S. PSI | ELG. % | Melt ° F. |
|---|---|---|---|---|---|---|---|---|---|---|---|---|---|---|
| Fe | Hot Dip Coat | | | 22% | 48% | | 1% | | 27% | 2% | | | | 1120 |

NOTES:
\*= Composition of Catalysts
\*¹= Plus 5% Phosphorus
\*²= Fe = low alloy and stainless steels
\*³= Cu = Including brass, bronze, and monel alloys
\*⁴= Al = Aluminum alloys
Processing of Hot Dip Coatings May Require Inert, Vacuum, or Hydrogen Furnace Atmospheres

What is claimed is:

1. A hybrid energy conversion system comprising a fuel cell and a heat engine selected from the group consisting of externally heated engines and internal combustion engines, in which waste heat from said engine is utilized to produce hydrogen from a feedstock, and wherein a portion of said hydrogen is supplied to said fuel cell for energy conversion.

2. The hybrid energy conversion system of claim 1, in which the production of hydrogen also produces byproducts, which are separated from said hydrogen and fed into the combustion zone of said engine.

3. The hybrid energy conversion system of claim 1, also including a pressurized electrolysis cell or a non-pressurized electrolysis cell, and in which heat from said engine is utilized via countercurrent heat exchange means in either of said electrolysis cells.

4. The hybrid energy conversion system of claim 1, in which heat from said engine is used for production of work by means selected from the group consisting of a turbine, a piston engine, a piston motor, an expansive chamber motor, and an expansive chamber engine.

5. The hybrid energy conversion system of claim 3, in which said pressurized electrolysis cell or said non-pressurized electrolysis cell produces hydrogen or oxygen.

6. The hybrid energy conversion system of claim 3 in which said pressurized electrolysis or said non-pressurized electrolysis cell produces hydrogen and wherein said hydrogen is stored under pressure to provide potential energy for a subsequent energy conversion process selected from the group consisting of a turbine, a piston engine, a piston motor, an expansive chamber motor, and an expansive chamber engine.

7. The hybrid energy conversion system of claim 1, in which said feedstock is selected from the group consisting of water, methane, ammonia, ammonium hydroxide, cyanoacetic acid, a mixture of a hydrocarbon and hydrogen peroxide, a mixture of methanol and ethanol, a mixture of methanol and propanol, an mixture of methanol and butanol, a mixture of ethanol and amyl alcohol, a mixture of methanol and phenol, 144-proof ethanol, 130-proof ethanol, a mixture of gasoline and wet methanol, and a mixture of diesel and wet methanol.

8. The hybrid energy conversion system of claim 2, in which hydrogen is separated from said byproducts by means selected from the group consisting of a membrane, adsorption, condensation, distillation and absorption.

9. The hybrid energy conversion system of claim 8, in which hydrogen is separated from said byproducts by a membrane, said membrane being formed of palladium, a palladium-silver alloy, an iron-titanium-copper alloy, or a ceramic material.

10. The hybrid energy conversion system of claim 1, in which said feedstock receives heat from said engine via countercurrent heat exchange means.

11. The hybrid energy conversion system of claim 1, in which said feedstock is reacted with a substance selected from the group consisting of air, hydrogen peroxide, and oxygen.

12. A hybrid energy conversion system comprising a heat engine, a fuel cell, means for producing hydrogen from a feedstock, and means for separating hydrogen from byproducts also produced from said feedstock, a gas expansion motor, where said hydrogen is supplied to said fuel cell, and where a portion of heat from said heat engine is used by said gas expansion motor either to drive a device selected from the group consisting of an electrical generator, a compressor for turbocharging said engine, a pump for supplying fuel to said fuel cell, a pump for supplying air to said fuel cell, or for propulsion.

13. The hybrid energy conversion system of claim 12, wherein said means for producing hydrogen is selected from the group consisting of a non-pressurized electrolysis cell and a pressurized electrolysis cell.

14. The hybrid energy conversion system of claim 12, further comprising a heat exchanger which removes heat from the exhaust gases of said engine and dissipates acoustical sound energy from said engine.

15. The hybrid energy conversion system of claim 13, further comprising either an electrical generator powered by said engine or means for generating power from the regenerative slowing of a vehicle, wherein either of said electrolysis cells occasionally receives electricity from either said electrical generator or said regenerative slowing.

16. The hybrid energy conversion system of claim 14, wherein said heat exchanger is selected from the group consisting of a heat exchanger which accepts the flow of exhaust gases from said engine on the outside of a substantially helical coil of flattened tubing, and a heat exchanger which includes a twisted tube and an outer containment tube having an inner diameter substantially the same as the outer diameter of said twisted tube.

17. The hybrid energy conversion system of claim 12, in which said means for producing hydrogen uses heat from said engine.

\* \* \* \* \*